United States Patent [19]

Burns

[11] Patent Number: 4,777,630

[45] Date of Patent: Oct. 11, 1988

[54] PROCESSING OF REFLECTED SIGNALS

[75] Inventor: David Burns, Cork, Ireland

[73] Assignee: Salubre Investments Limited, Cork, Ireland

[21] Appl. No.: 715,017

[22] Filed: Mar. 21, 1985

[30] Foreign Application Priority Data

Mar. 22, 1984 [GB] United Kingdom ................. 8407512

[51] Int. Cl.$^4$ ............................................... G01S 9/66
[52] U.S. Cl. ........................................ 367/87; 367/88; 367/107; 342/94
[58] Field of Search .................. 181/123, 124; 367/87, 367/88, 92, 93, 98, 99, 107, 112, 114, 116, 122, 127, 128, 143; 342/52, 61, 94, 134, 137

[56]  References Cited

U.S. PATENT DOCUMENTS

| 3,145,363 | 8/1964 | Haslett | 340/3 |
| 3,478,308 | 11/1969 | Stanley et al. | 340/3 |
| 3,739,328 | 6/1973 | Beil | 340/15.5 |
| 3,742,438 | 6/1973 | Brede | 340/3 |
| 3,980,983 | 9/1976 | Shannon | 367/99 |
| 4,048,081 | 3/1987 | Burns | 367/87 |
| 4,439,844 | 3/1984 | Menin | 367/87 |

FOREIGN PATENT DOCUMENTS

| 310929 | 10/1973 | Austria . |
| 2121555 | 1/1972 | France . |
| 816119 | 7/1959 | United Kingdom . |
| 1282572 | 10/1968 | United Kingdom . |
| 1254728 | 2/1969 | United Kingdom . |
| 1570090 | 12/1976 | United Kingdom . |
| 2102573 | 7/1982 | United Kingdom . |

OTHER PUBLICATIONS

Digital Read-out Echo Sounder, C. H. Cooke, The Radio and Electronics Engineer, Jun. 1967.
"Ground and Fish Discrimination in Underwater Acoustics", D. Burns, D. B. Queen and R. C. Chivers.
"On the Detection of Fish Close to the Sead Bed", Rober C. Chivers and D. Burns, Acoustics Letters, vol. 9, No. 5, 1985.
"A Fish Counter for Use in Commercial Fishing", P. J. Hearn, Technical Conference on Fish Finding, Purse Seining and Aimed Trawling, Apr. 27, 1970.
"An Automatic Method of Counting Fish Echoes", R. B. Mitson and R. J. Wood, Fisheries Laboratory, Lowestoft.

Primary Examiner—Deborah L. Kyle
Assistant Examiner—Brian S. Steinberger
Attorney, Agent, or Firm—Spensley Horn Jubas & Lubitz

[57]  ABSTRACT

Signal processing circuitry is disclosed for processing the echo signals of echo sounders to extract the leading edge of bottom echo components of the echo signals and to provide a reading of the average area under successive leading edges. Second and later bottom echo processing is additionally disclosed. Processing is achieved with a sample and hold circuit comprising an integrator (34), a first switch (33) for switching the required echo signal portion to the integrator, storage means (C2) for storing integrated values to be displayed, and a second switch (35) for selectively coupling values from the integrator to the storage means.

26 Claims, 11 Drawing Sheets

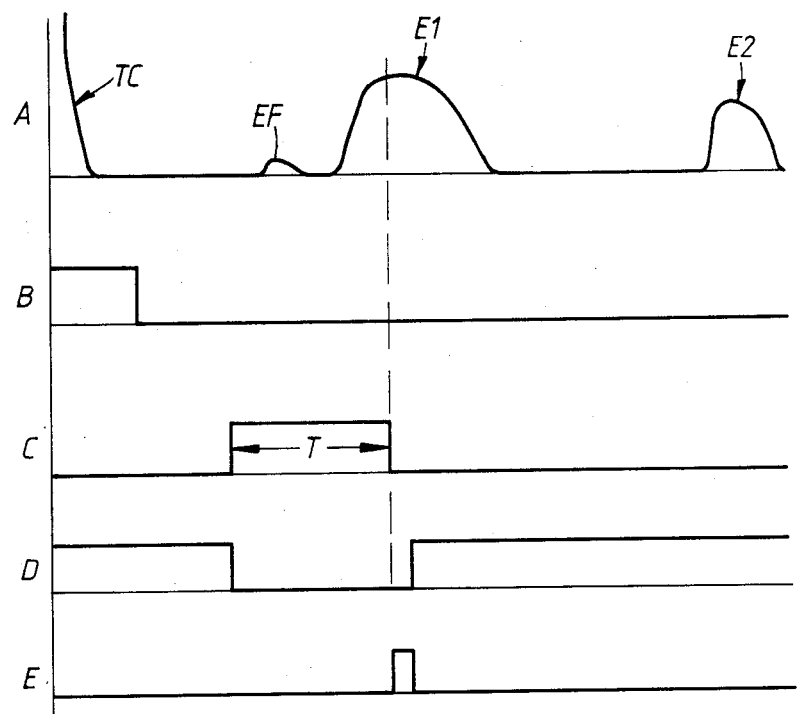
*FIG.2.*
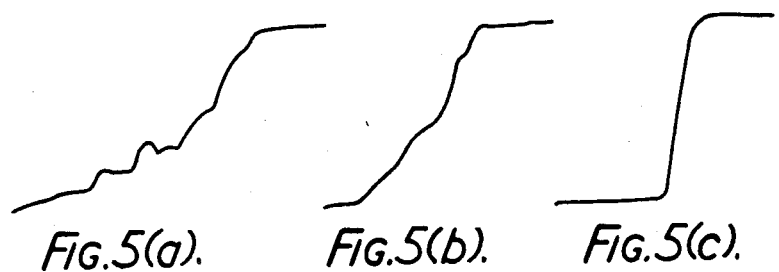
*FIG.5(a).*    *FIG.5(b).*    *FIG.5(c).*

PROCESSING OF REFLECTED SIGNALS

BACKGROUND OF INVENTION

This invention relates to the processing of reflected, or echo, signals obtained by the use of signal transmitter-receiver equipment and has particular applications in the fields of hydro-acoustic transceivers, such as sonar equipment, echo sounders, and medical acoustics, and the field of radar, especially marine radar.

The terms transceiver and transmitter-receivers when used herein are intended to mean equipment for transmitting pulses and for receiving consequent echoes of the transmitted pulses, and is not limited, unless it is otherwise expressly stated, by the type of pulse (e.g. it may be sonic, supersonic or electromagnetic) nor is it limited to equipment which shares transmitting and receiving parts.

In the field of sonic and supersonic waves, equipment is available, such as sonar and echo sounders, which gives audible and visible indications of the existence of return echoes. Echo sounders, for example, give results recorded on recording paper.

In order to improve such equipment, circuitry has been designed for processing the return echo signal in order to extract from it more information than has heretofore been readily available with this type of equipment. Such a circuit is shown in U.K. specification No. 8221670 in which means are provided to extract the second bottom echo component of the return echo signal in order to provide information about the nature of the seabed. In that specification, it was disclosed that the nature of the seabed was revealed by sensing whether or not the second bottom echo component had an amplitude above a preset threshold level.

It has now been discovered that further useful information is present in the return echoes of equipment such as echo sounders and that this information can also be present in the return echoes of sonar, radar, medical ultrasonics and transceivers generally.

In particular, it has been discovered that information resides not just in the timing and size of a return pulse but also in its shape. Owing to saturation effects, such information is normally not available in the return echo of high power equipment. When lower transmitted power is employed, it has now been found that return echoes have shapes depending upon the nature of the reflecting surface or surfaces, for example seabed layers as is pertinent in surveying and sub-bottom profiling.

SUMMARY OF INVENTION

Thus, according to one aspect of the present invention there is provided apparatus for processing echo signals received by receiver equipment in response to a transmitted pulse, the apparatus comprising: means responsive to the return echo signal received by such equipment to define a time slot synchronised with a pulse of said echo signal; and means for utilising said time slot to extract only a portion of said pulse of the return echo signal, said time slot being such that the utilising means provides a signal representative of a characteristic of only the leading edge of said pulse.

Preferably the utilising means comprises integrating means such that said signal is representative of the area under said leading edge of the pulse.

It has been found that the area under a return pulse edge conveys information characteristic of the nature of the body reflecting the transmitted signal and that this area can be displayed on an analog meter, or digitally, so as to display to the user a value which changes noticeably with the nature of the reflecting body. In echo sounding, for example, the inventor has been found that the leading edge of the bottom pulse (first, second or later, but especially the first) varies in dependence upon the nature of material close to and at the seabed, and in particular in dependence upon the nature of the top layers of the seabed. Thus, a very steep rising (leading) edge provides a relatively low value of representative signal and indicates a hard seabed with no significant mud. On the other hand, a relatively high displayed value of the area under the leading edge indicates that a layer of mud exists on the seabed (useful information to prawn fisherman and in dredging and underwater surveying) or that there are fish close to the bottom. Displayed variations in the value are also of interest. It is believed that such an analysis can also be applied in medical ultrasonics to determined differences in the nature of various tumours or other features existing in the human and animal body, especially in the eye.

A reflected pulse would, in theory, have a shape almost entirely dependent upon the nature of the receiving equipment, because, one would imagine, the rise time of the received pulse would be mainly dependent upon the response time (transient response) of the receiving equipment. Integrating or otherwise analysing the leading edge would therefore give information only about the receiving equipment. We have discovered that this is not so. Using a standard echo sounder with a transmitted pulse width of the order of 300 microseconds, the received pulse from the bottom has a shape depending upon the nature of the upper layers of the seabed, with a leading edge which may even be from one to two milliseconds. Possibly the return pulse, as it exists in the echo sounder, is a merged form of several reflections and scattering from various depths of the seabed layers. This would explain the fact that the leading edge gives information about these layers. A leading edge that is merely a transient rise time would probably last only for a hundred or so microseconds, not one or two milliseconds. As is described below, the time slot is synchronised with the returning signals in such a way that it is not fixed but is automatically varied in accordance with the length and shape of the leading edge. Thus, as the leading edge varies in length and shape with the nature of the seabed, the position and length of the time slot may vary. Using a fixed, short, time slot would, possibly, often only capture transient response. That is not what the preferred embodiments of the present invention do.

If the invention is used in conjunction with equipment having a sufficiently short transmitted pulse and short transient response, one might well not see a smooth leading edge over the time slot that we are concerned with. One might well see a series of peaks in that time slot caused by wavefronts from successive regions below the seabed and from scattering. One could smooth or integrate that signal in order to produce the same form of leading edge as would be produced by a conventional echo sounder. That smoothed signal could then be used to define the time slot used for capturing the "leading edge", although, in that case, one would actually be capturing a series of leading edges.

Another aspect of a preferred embodiment is its simplicity. It does not seek to extract many pieces of data, with high resolution, from return signals. That would require expensive equipment and the displays may well be confusing owing to the wealth of detail, requiring very experienced interpretation. In contrast, this preferred embodiment provides a relatively simple means, for use for example in conjunction with a conventional echo sounder, of obtaining a value representing a reflecting surface and displaying that value on a meter or the like, so that the average user of such equipment, e.g. a fisherman or a dredger operator, can see the needle of the meter to obtain a single representative value without the confusion of multiple, complex, displays on paper or on a cathode ray tube.

The time slot can be defined in various ways. Thus, to examine the leading edge of an echo pulse, the trailing end of the time slot can be determined by the use of level detecting means to define the trailing end in dependence upon the return echo signal level passing through a given level. If one picks a rising level for defining the time slot, then, in one embodiment, a delay (small in relation to a typical echo pulse) may be introduced to cause the end of the time slot to approximate more closely to the peak of the echo pulse concerned. In that way, the time slot is automatically adjusted to the nature of the received pulse.

Smoothing means may be required to smooth out peaks in the leading edge to prevent response of the level detecting means to such peaks.

The leading end of the time slot may be defined by means responsive to a signal representative of the transmitted pulse, such that said end occurs at a given time after the occurrence of the transmitted pulse. That given time may be made adjustable, so that the user can lengthen and shorten the time slot as required, e.g. so as to increase or decrease the effect on the results of fish that may be swimming close to the seabed. However, this is not always satisfactory. For example, in a depth sounder the echo concerned may be the bottom echo, but this moves relative to the transmission pulse as the seabed rises and falls. The time slot would thus change with the rise and fall and so falsify the readings. Thus, in one preferred embodiment, the beginning of each time slot is set to occur at a given, adjustable, time after the occurrence of the echo pulse in the preceding cycle of the return echo signal, i.e. so as to be at an adjustable 'height' above the seabed.

The principles outlined above may be applied generally in echo systems, whether or not the signals are acoustic or electromagnetic (as in marine radar) or whether or not the signal is projected vertically (as in echo-sounders) or generally horizontally as in sonar and in marine radar. In all such cases, one can arrange that the time slot synchronizes or locks onto a particular echo pulse, whether it be representative of the seabed, a shoal of fish or some other body in, or floating on, the water. One can then produce a visual display to the user on a meter of a characteristic of the leading or trailing edge of that echo pulse and so provide him with more information as to the source of the echo than would normally be available with conventional radar, sonar or echosounder displays.

In a typical application, the transmitter will transmit pulses repetitively so that cycles of return echo signals are received. In that case, there are preferably means for holding the value of said representative signal for display when, in a subsequent cycle, said time slot is not definable owing to poor signal reception. In that case, any indication given to the user of the value of the characteristic will not be seen to vary uncontrollably should poor echo signals result because in that case the user will be presented with the last, correctly, ascertained value. This feature can obviate problems which may be encountered due to bad weather conditions interfering with the transmission of a pulse or the reception of a return echo. As another development, the holding means may itself form an average, e.g. to provide a signal for display which is the average of several, e.g. three of four, preceding values. This is useful when circumstances are such that the display would otherwise oscillate unacceptably.

Thus according to a second aspect of the invention, there is provided apparatus for processing the return echo signals produced as the result of transmitting a series of pulses, and comprising timing means responsive to an echo pulse of given property within the echo signals in each cycle of return echo signals to define a time period synchronised relative to said echo pulses, means for storing a characteristic of the return echo signals, means for displaying the currently stored characteristic, sampling means for controlling the supply of data to the storing means in dependence upon said time period such that the stored characteristic is representative of that portion of the return echo signals within a given time slot of the cycles, and means responsive to the absence of said echo pulse in one cycle of return echo signals for controlling the sampling means to prevent sampling and thus to prevent updating of the storing means.

One general concept mentioned in the above description is the use of a time slot to extract a desired portion of a return echo together with means to process the extracted portion to obtain a signal representative of the mean value of the portion in the time slot. Another application of that concept is in pelagic fishing where the time slot defines an area at a depth defined by the manually selected timing of the time slot. The resulting signal defines the level of echo from that area and rises when fish are present.

It has been discovered that there is a further application of that concept to improve information extraction in forward-looking transceivers, i.e. in conventional sonar and marine radar direction and/or range finding equipment. Such equipment conventionally gives a display on a cathode-ray tube showing all return echoes of sufficient magnitude, including noise signals. In order to improve the performance of such equipment, attempts have been made to incorporate filters to filter out the noise content of such signals. Nevertheless, it is difficult to detect small craft, for example, because of the level of noise and sea clutter inherent in the environment.

Thus, according to another aspect of the present invention, there is provided equipment comprising a transmitter for transmitting a series of acoustic pulses at ultrasonic frequency in a direction with a horizontal component (and perhaps even with a small upward component), and a receiver for processing return echo signals consequent upon reflection of the transmitted pulses, the receiver comprising a circuit having: means for defining a time slot for extracting from the return echo signals those returning from a reflection within a selected range; and means for averaging the extracted signal in each repetition. One may therefore visually or automatically compare the average with a preceding average or averages to provide an indication of change in average value, representative of a change of data within noise, and hence representative of possibly useful information within the selected range. An alarm may be triggered by a suitable level of change.

This aspect of the invention concerns the use of features already described above, i.e. a time slot together with averaging or integration, but in this case the time slot is not necessarily locked onto any specific echo pulse but is manually set in terms of its range and duration to "look" at a particular zone spaced horizontally away from the vessel carrying the equipment, i.e. the axis of the beam (or main lobe) of transmitted pulses is not vertical. By looking at changes in the "noise", rather than by attempting to filter out the noise, data of interest can be detected, even though it might not be visible on a conventional cathode-ray display or paper recorder. Thus a fish shoal would cause an increase in the "noise" level. In another application, this equipment is used to detect objects on or near the surface and which might damage a vessel. An audible alarm signals whenever the received echo within the range concerned rises above a certain value (e.g. in amplitude or in integrated value) set by the user.

A further aspect of the invention relates to a circuit for use in detecting the nature of the seabed from the return echo of a hydro-acoustic transceiver, the circuit comprising means to define a time slot to extract from the return echo one of the bottom echo components, and means for processing the extracted component to produce a width signal when the width of the extracted component exceeds an adustible value.

This aspect of the invention is particularly applicable to the second bottom echo component where, it has been discovered, the width of the component is a property directly related to the hardness of the seabed. The resulting signal can thus be fed to an alarm to give an alarm when the signal represents the attainment of a sufficient hardness of seabed to damage a fishing net. Specification No. 2102573 disclosed producing a warning signal dependent upon the magnitude of the second bottom echo component and the present aspect of the invention preferably incorporates that idea by responding to width only when the second bottom echo has at least a given magnitude. One may give an additional safeguard by only issuing the warning signal when the criteria of threshold and width are met on two (or more) successive signals, thereby eliminating many spurious responses. This aspect of the invention may also be applied to third or later bottom echoes.

In this respect and in relation to leading edge analysis according to the first aspect, it has been discovered that the first bottom echo component can be subject to noise and distortion especially in bad weather conditions, whereas the second and subsequent bottom echo components are relatively undisturbed and may thus be more useful for leading edge analysis, and also for seabed analysis as described under the further aspect of the invention.

An alternative ground alarm may be based upon an integration of the second, or later bottom echo.

According to this aspect of the invention, there is provided a circuit for use in detecting the nature of the seabed from the return echo signal of hydro-acoustic transmitter receiver equipment, the circuit comprising means for defining a time slot to extract from the return echo signal the second, or later, bottom echo component, and means for integrating the extracted component to provide an indication of its energy content.

Another aspect of a preferred embodiment when applied to fishing concerns a fish detector for detecting fish close to the bottom. According to this aspect of the invention, there is provided a method of detecting fish close to the seabed and comprising: repetitively transmitting a signal towards the seabed; detecting the return seabed echoes to define a time slot in each cycle terminated by that sea bed echo; using that time slot to extract a portion of the returning echoes in each cycle; introducing a delay into the return echoes relative to said time slot; adjusting the delay until the extracted portion is substantially zero, whereby the time slot terminates substantially at the sea bed; and subsequently providing an indication of the value of the extracted portion as a fish indication.

A further application concerns a ground indicating circuit which is particularly applicable to the indication of suitable ground for lobster fishing.

According to this aspect of the invention, there is provided a circuit for use with hydro-acoustic transmitter-receiver equipment, to provide an indication of ground conditions, the circuit comprising timing means responsive to return echo signals to define a time slot embracing more than one bottom echo signal, integrating means for integrating the return echo signal received within said time slot, and means for providing an indication of the integrated value.

BRIEF DESCRIPTION OF THE DRAWINGS

For a better understanding of the invention and to show how the same may be carried into effect, reference will now be made, by way of example, to the accompanying drawings, in which

FIG. 2 shows a series of wave forms illustrating the operation of circuitry within FIG. 1;

FIGS. 5a to c show return echo waveforms;

DESCRIPTION OF PREFERRED EMBODIMENTS

Figure 1:
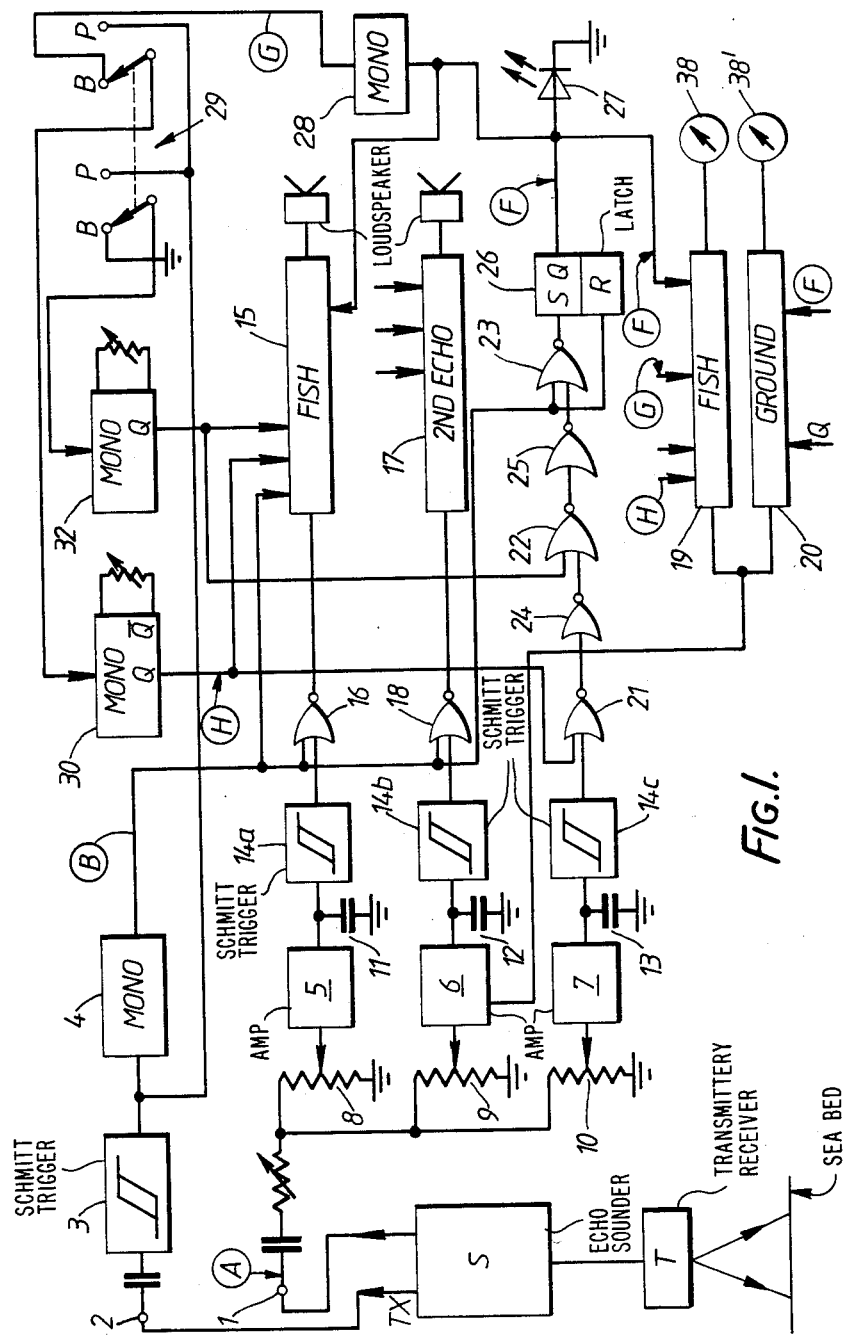
FIG. 1 is a general block diagram of echo pulse processing circuitry.

Referring to FIG. 1, this shows circuitry designed specifically to process the return echo signals A from a conventional echo sounder S with transmitter/receiver transducer T. The analog return echo signal, after time varied gain (TVG), is supplied to input 1 and the form of this signal is shown generally at line A of FIG. 2. It is a repetitive signal comprising, in each repetition, a large transmission component TX, a first bottom echo component E1 and a second bottom echo component E2, all of successively decreasing amplitude. In between the transmission component and the first echo component there may well be a fish echo as shown at EF. Various noise and other echo signals might also be present but their magnitudes are insignificant in the present context and are not shown in FIG. 2. If the circuitry were employed in the context of a forward-looking sonar or marine radar, a cyclic pattern of pulses would similarly occur but the form of the signal would be different, nevertheless including pulses such as that shown at E1 when the environment includes any reflective "body" such as a boat or shoal of fish.

Even using conventional echo sounder TVG some distortion or saturation may occur in some conditions and it may therefore be beneficial to provide an alternative TVG circuit to overcome saturation and so make more information available. For example, a microprocessor with a mathematical algorithm could provide the TVG process.

The echo sounder S additionally provides a pulse TX at an input 2 in FIG. 1, this pulse defining the time at which the transmission pulse is emitted by transducer T. From input 2, the pulse TX is passed to a Schmitt trigger circuit 3 for shaping and then to a monostable circuit 4 providing a stretched pulse B (line B of FIG. 2) which is used in the circuitry as a mask to filter out the TX component of the echo signal and acoustic noise close to the transmitter.

Returning now to the analog signal provided at input 1, this is applied to three analog amplifiers 5, 6 and 7 having a gains which may be varied by the user at variable resistors 8, 9 and 10.

The amplifiers have capacitors 11, 12 and 13 connected across their outputs which are connected to Schmitt trigger circuits 14a, 14b and 14c. The capacitors provide smoothing to the leading edges of echoes in an attempt to avoid lead detecting processes, to be described, being falsified by distorted leading edges. Circuit 14a feeds a fish alarm circuit 15, to be described in more detail later with reference to FIG. 13, via a NOR gate 16 fed by signal B to blank transmission pulses. Circuit 14b feeds a second echo ground alarm 17 via a NOR gate 18 also fed by signal B. The second echo ground alarm 17 may be described herein with reference to FIG. 9, responding to pulse width, or may respond to pulse height as set forth in British published Patent Application No. 8221670 (2102573), now U.S. patent application Ser. No. 572,055. Amplifier 6 also feeds its analog signal (corresponding to A in FIGS. 2 and 3) without smoothing to fish (19) and ground (20) metering circuits to be described hereinafter.

Figure 3:
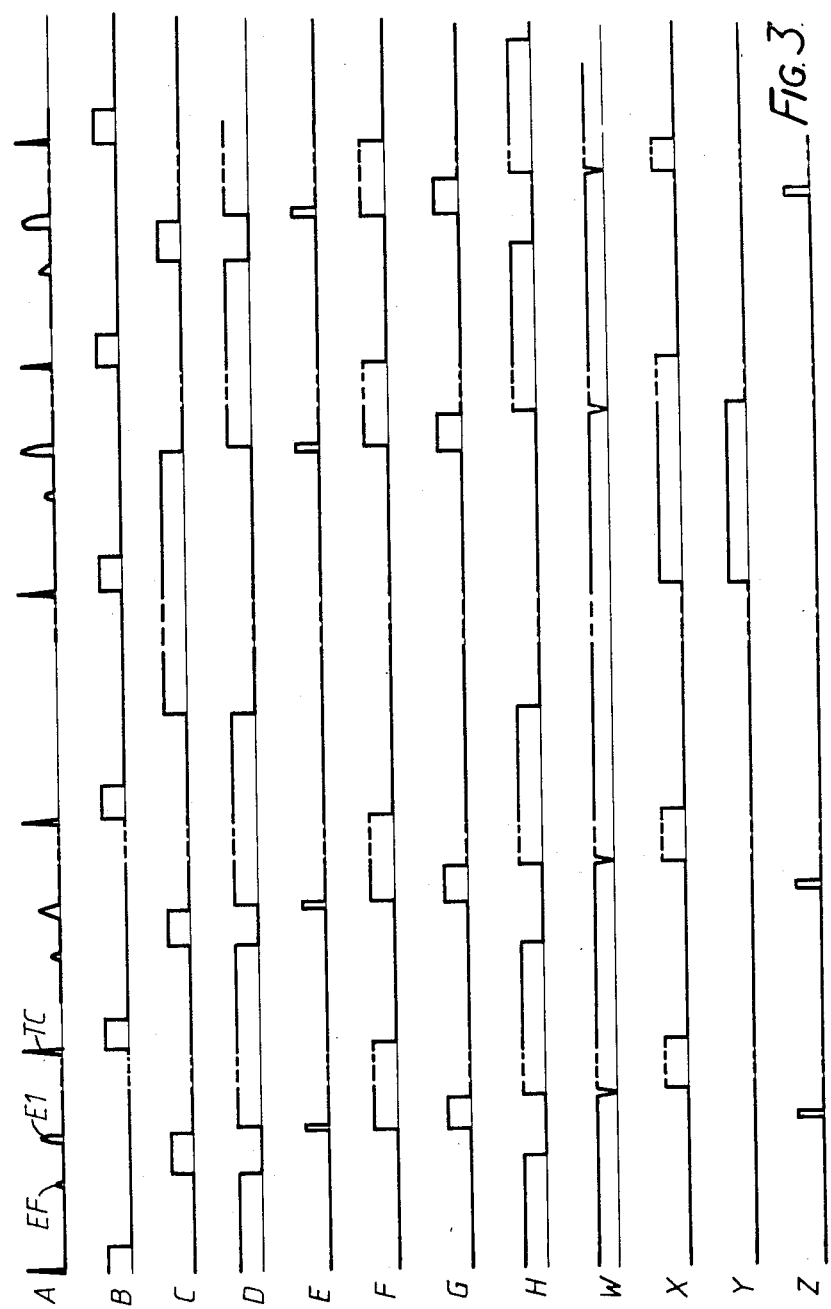
FIG. 3 shows more detailed wave forms to a longer time scale.

Circuit 14c supplies a bottom pulse detection circuit and this will be described with reference to FIG. 3 which shows more detailed wave forms over several cycles of the return echo signal A, including signals B, C, D and E of FIG. 2. Schmitt trigger circuit 14c provides at its output a digitised version of signal A, i.e. with its pulses converted to a series of square pulses of uniform amplitude. These pulses are passed through a series of NOR gates 21, 22 and 23 and inverters 24 and 25 to a latch 26 the Q output of which is signal F shown at line F of FIG. 3. This signal F is a pulse commencing from a given amplitude point on the rising edge of the first echo and terminating on the commencement of signal B, fed to the reset input of the latch 26. The threshold for the rising edge of the echo signal E1 is selected by adjustment of the resistor 10. The repetitive signal F is fed to a light emitting diode (LED) at 27 which will be seen to be flashing in normal use of the equipment. The threshold, during set up, will be increased until that flashing stops and then decreased again until the flashing just starts in order to set a threshold for this channel appropriate to detecting a point high up on the rising edge of the echo pulse concerned. In order to prevent response of the channel to other pulses, the transmission pulse itself is masked by feeding signal B to NOR gate 23 and other signals can be masked by applying further signals via NOR gates 21 and 22. Signal F is fed to a monostable circuit 28 which provides a 40 millisecond pulse G (line G of FIG. 3). With a switch 29 in the position B indicated, the pulse G is fed as an input to a monostable circuit 30 producing at its Q output a marker pulse having a duration determined by the user at variable resistor 31. Capacitors can also be switched into and out of circuit with circuit 30 by a section of switch 29 to vary the timing range of adjustment produced by resistor 31. This pulse from the Q output of monostable circuit 30 is signal H in FIG. 3 and will be seen to commence on the falling edge of pulse G and to stop some later time, adjustable by the user, so as to be the desired amount ahead of the leading edge of the next first bottom echo pulse E1.

As described so far it will be appreciated that there is provision of several gating signals to define ranges over which an echosounder signal can be processed, these including signal G defining the sea bed, i.e. the bottom pulse, and signal H defining a point an adjustable height above the sea bed.

Switch 29 provides other gating signals when in its other position P. In that case, monostable circuit 30 is fed by signal TX after shaping from circuit 3 and so provides a version of signal H defining an adjustable depth below the transducer. Similarly, a second monostable circuit 32 provides a second signal to define another adjustable depth below the transducer. Together these signals provide an adjustable range, e.g. for the fish alarm circuit 15 to be described.

Before discussing the details of the remaining circuitry the concepts behind fish and ground metering circuits will now be described. These circuits comprise integrating or averaging means for averaging the areas under the return echo for specific time slots within each pulse repetition period, i.e. cycle. With regard to the fish metering circuit one may use a time slot such as shown at C in FIG. 2 to define a lower area of the sea, terminating at or near the top of the leading edge of the bottom pulse E1. The output goes to meter 38 which will show a rising value as one travels into an area of softer ground and/or of fish near the sea bed.

By contrast the ground meter 20 will integrate or average over a time slot to include substantially the whole of a bottom echo (first and/or second and/or third etc). As one traverses into hard ground, the reading of meter 38' will rise.

Thus, if meter 38 rises and meter 38' falls, then this is normally indicative of soft ground. If meter 38 rises and meter 38' is constant, this is normally indicative of fish. These meters are thus complementary, and useful not only for fisherman but also in hydrographic survey work.

Figure 4:
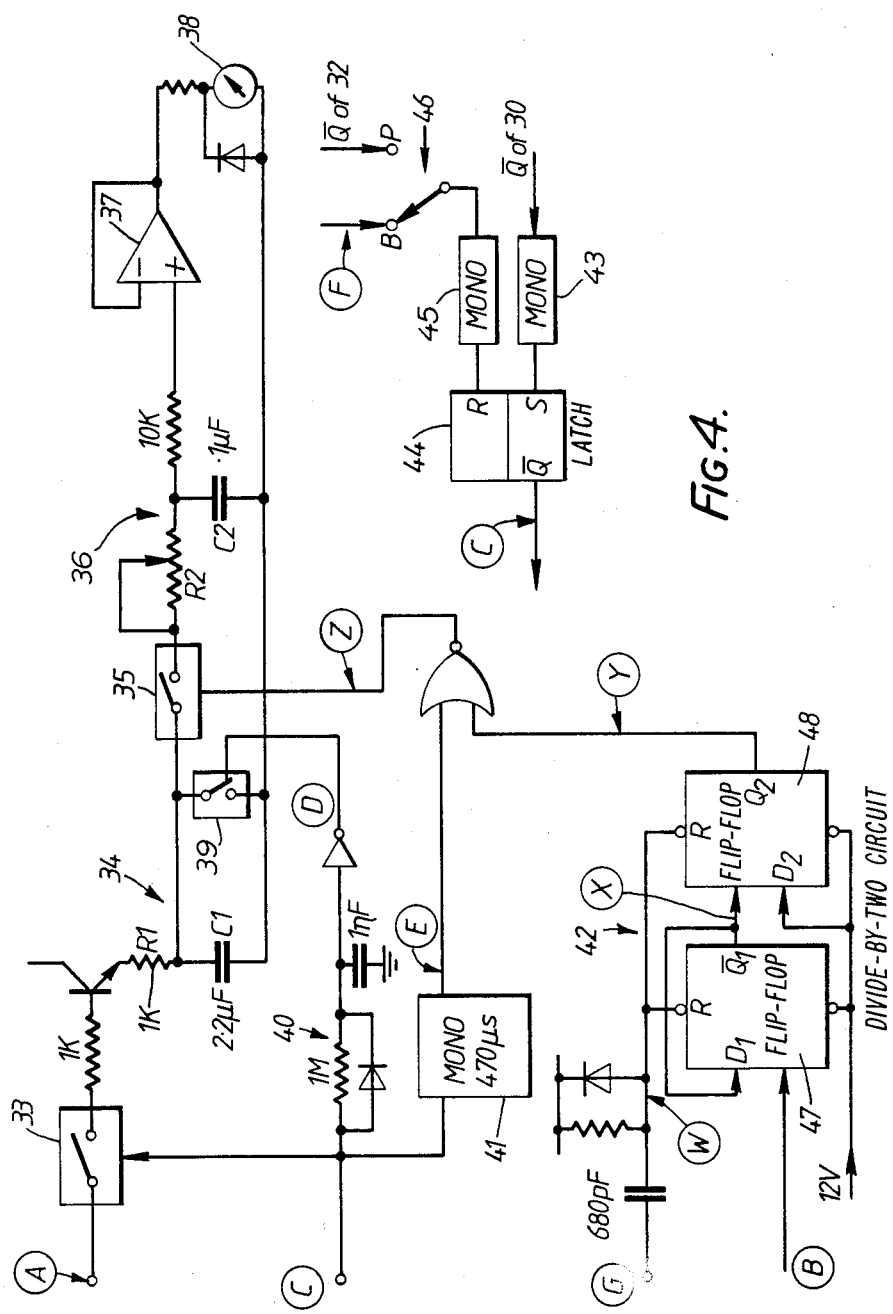
FIG. 4 shows a circuitry implementation for a portion of FIG. 1.

Attention will now be directed to fish metering circuit 19 which is shown in more detail in FIG. 4. The analog signal A from amplifier 6 is passed to a switch 33 and thence to an integrator 34 and through a further switch 35 to a sample-and-hold circuit 36 the output of which is fed to indicator drive circuitry 37 driving an ammeter 38. Ammeter 38, in this embodiment, requires a one milliamp input current for its full scale deflection over 270°.

Switch 33 is controlled by a signal C (line C of FIG. 2), and switch 35 by a signal E (line E of FIG. 2).

The output of the integrator 34 is coupled to earth by a switch 39 controlled by a signal D (line D of FIG. 2), signal D being produced by a pulse stretcher 40 inverting and stretching signal C.

As will be described in detail below, signal C is a masking signal, in this example, to extract from signal A a portion including the first bottom echo signal E1, but only its leading edge. The masking signal C defines a time slot T, the beginning of which is set by the user to occur a desired time after the preceding pulse E1 and the end of which is determined by the signal E1 rising through a preset value.

The integrator 34 thus integrates the portion of the signal A occurring in the time slot T, as it is then enabled by the opening of switch 39 by the inverted and stretched version D of signal C.

In the short interval commencing at the end of signal C and defined by monostable circuit 41, a signal E is produced to close switch 35 and thus cause the output of the integrator 34 to be passed to the sample-and-hold circuit 36 for display by meter 38.

Means (to be described) are provided to prevent the issue of pulse E when pulse E1 is of low level due to poor transmission or reception conditions, so that meter 38 continues to display the integration of the last pulse E1 of adequate magnitude. Thus, the meter reading does not significantly change in response to loss of pulse E1. After loss of pulse E1, display of newly integrated values is prevented until divide-by-two circuit 42 detects that two pulses E have occurred in two successive transmission cycles (defined by signal B).

The inverse of signal H is taken to a monostable circuit 43 and is there utilised to define the start of the time slot, i.e. on the falling edge of pulse H (this is the rising edge of the inverse signal supplied to the monostable circuit 43). The signal from monostable circuit 43 sets a latch 44 the output of which is signal C as already described. The falling edge of signal C is created by a reset signal provided by a monostable circuit 45 activated by the leading edge of signal F occurring at the pre-adjusted threshold on the rising edge of the echo pulse E1. In the third cycle of FIG. 3 there is shown the situation in which the first bottom echo component E1 is insufficient in amplitude to generate the pulse F. In this case, latch 44 is not reset so that pulse C no longer has a falling edge at the bottom pulse. In the absence of that falling edge, monostable circuit 41 is not triggered and in the consequent absence of pulse E no new value is supplied to the sample-and-hold circuit 36 which thus maintains the preceding value at meter 38.

Further details of the circuit diagram of FIG. 4 will now be considered. Intergrator 34 comprises a transistor stage 5 providing amplification and also providing integration by use of a resistor R1 and apacitor C1 in that stage. The switch 39 is shown connected across the capacitor C1. The time constant of that stage is chosen to ensure that the capacitor C1 develops a voltage substantially proportional to the voltage time area of the input signal in the appropriate time slot. Switch 39 and capacitor C1 are designed so that the meter reading is substantially independent of changes in repetition rate of the transmission pulses, within a working range.

The voltage from the capacitor C1 is passed through switch 35 to a further storage capacitor C2 via a variable resistor R2 to which the integrated value is transferred during the existence of the short pulse E. The voltage on the capacitor C2 is isolated from the meter 38 by an operational amplifier constituting the driver stage 37. Resistor R2 can be varied to change the time constant of the circuit so as to damp out variations in the output signal as may occur, particularly, in bad weather conditions. A large value of R2 effectively causes the output 38 to register the average of several successive cycles, e.g. 4, 8 or more as required.

A detailed circuit implementation of the pulse stretcher 40, monostable circuit 41 and divide-by-two circuit 42 employed in this network is also shown in FIG. 4. Divide-by-two circuit 42 is composed of two dual D-type rising edge triggered flip flops 47 and 48. Both are cleared by the negative going edge of signal G. Signal B has the effect of inverting the previous value of the output of flip flop 47. When the bottom pulse (G) is lost, the output of 47 is not cleared. Signal B will invert the output of 47 to a high level causing the output of 48 to go high and so prevent the pulse E from reaching switch 35.

A modification possible to the circuit of FIG. 4 has means, utilising the sample-and-hold facility, to avoid the effects of vessel movements in bad weather, and/or when operating at extreme depths. In this case, means, such as a mercury bowl switch, are employed to detect when the vessel is not substantially vertical. These means are coupled to the circuit 42 to prevent the output of flip flop 47 from being cleared, so preventing pulse E from reaching switch 35. Thus, only samples of the leading edge when the vessel is substantially vertical will be utilised. This may have particular application when used for sea bed hydrography.

In use, the circuit of FIG. 4 has been shown not only to act as a fish meter, but also to give effective discrimination of ground conditions, 'softer' ground giving high readings on meter 38 and 'hard' ground giving low readings. Pulse C can be delayed by adjusting resistor 31 to reduce the effect of fish. FIGS. 5a to c show diagrams of sea bed echoes for soft, medium and hard ground, respectively. It will be apparent that, by integrating upto a given threshold, e.g. near the maximum value in FIGS. 5a to c, FIG. 5a gives a higher value than FIG. 5b or c. Why the waveforms have the shape they do is not entirely clear. One factor to bear in mind in any analysis is that reflection from a point on the sea bed is too simplistic an approach because the ultrasonic beam will in practice have an angle of upto, say, 30° so that a detected signal includes reflections at various depths from normal incidence and also from scattering at non-normal incidence. The initial part of the signal of FIG. 5a will comprise low level reflections from normal incidence as the wavefront penetrates the 'soft' ground. Possibly, at a later time, increased reflections occur due to the sub-bottom matter being more consolidated with depth. At the same time, these deeper reflections will be added to by the arrival of scattering from adjacent areas, so that the return echo will build up slowly as shown in FIG. 5a. On the other hand, with 'hard' ground, reflection from the surface of the seabed will substantially swamp such secondary effects, giving the sharp rise time of FIG. 5c.

As scattering is probably a significant factor and as it is frequency dependent, it is noted that the frequencies used in this context are recommended to be in the range of 30 KHz to 100 KHz, e.g. 50 to 60 KHz. With a frequency as low as 20 KHz, 'soft' ground may not be 'seen', whereas with frequencies as high as 200 KHz, 'soft' ground might well appear to be hard.

It is also believed that leading edge analysis will find applications other than those already mentioned for in marine sonar, especially fishing and hydrography. One can visualise medical uses for detecting and distinguishing between matter within the human body. One particular application is the examination of the retina, bearing in mind the fluid nature of the eye which provides a boundary between the fluid within the eye and the retina, such boundary thus being analogous to the sea bed.

The above description has mentioned the application of the described circuit to the leading edge analysis of the first bottom echo component. It may also be applied to leading edge analysis of the second (or later) bottom echo component.

Returning now to FIG. 4, the illustrated circuit has an alternative mode of operation when it is desired to examine an area of the environment horizontally or vertically spaced from the equipment, but independently of any echo pulse. Switches 29 (FIG. 1) and 46 (FIG. 4) are changed-over to the P position to cause circuit 30 to set latch 44 a first, adjustable, time after pulse TX and to reset it at a second, adjustable, time after pulse TX. The reset is via circuit 45, switch 46 and the adjustable monostable circuit 32. An adjustable time slot in relation to pulse TX can be generated in this way to give an integrated reading for a time slot independently of an echo pulse, so that an area of the sea can be analysed for a significant change in "noise" possibly indicative of data such as the occurrence of a shoal of fish or other "body". In this mode, the circuit has application to the processing of sonar and marine radar signals.

One specific application is in preventing damage to yachts and small craft at sea, as is frequently caused by large solid floating objects, generally described as flotsam and jetsam. The range of objects is almost infinite but the origins of many result from ever-increasing pollution, e.g. containers, oil drums, telegraph poles, etc.

Naturally occurring objects like whales and ice bergs are equally hazardous. Even with a good lookout, it can be impossible in poor visibility and or bad sea conditions to identify dangerous flotsam. At night no warning is possible.

Current technology for avoiding collisions uses marine radar proximity warning devices. This is only effective for objects giving a good reflection above the prevailing sea state. The circuit of FIGS. 1 and 4 as described so far and when set to the P position, is envisaged for enhancing signals received via a relatively low-cost echosounder system S having its transducer T fitted two or three feet below the water level and having a fixed beam of perhaps 30 degrees inclined forwards and towards the surface of the sea. A gated area is chosen by monostables 30 and 32 corresponding to perhaps 50 yards from the vessel to perhaps 200 yards. A greater range would be preferably but it is unlikely that the system would operate at greater range without using a much more sophisticated and therefore more expensive unit. The sample-and-hold technique would be used to integrate the total signals within the gated area together with some noise filtering and an operator controlled audible alarm threshold set, such alarm replacing the meter 38. If some large object dangerous to the safety of the vessel enters the gated area, the integrated value will increase marginally but enough to set off the alarm and therefore warn the skipper of the vessel. Because of the relatively repetitive nature of waves due to the swell etc. it may be possible to incorporate suitable filtering which may be effective in isolating the required obstruction signal.

Figure 6:
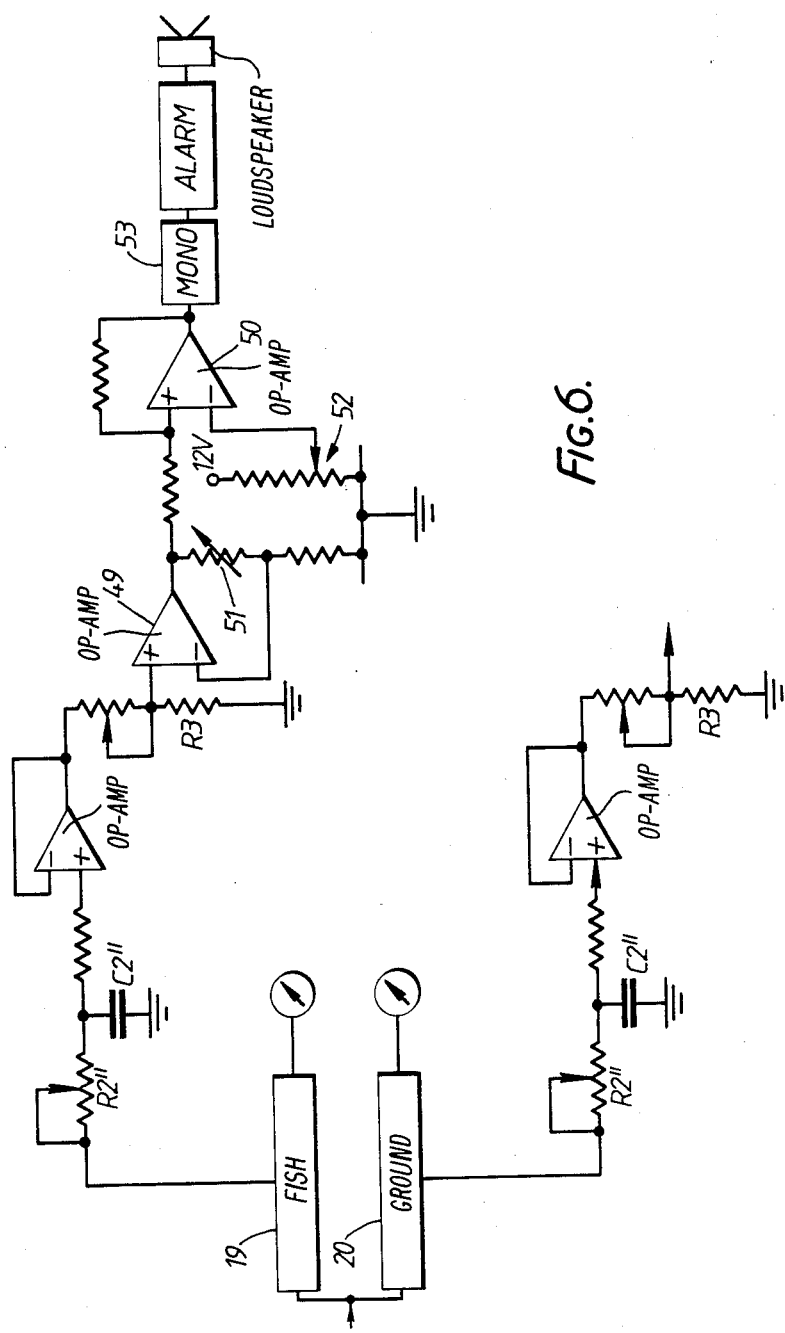
FIG. 6 is a diagram of a combined meter and alarm circuit.

In the fish and ground metering circuits of FIGS. 1 and 4 (and FIG. 7 to be described later) a meter is used to generate a visual indication of the conditions. An audible alarm circuit can be added to both circuits, if desired, as shown in FIG. 6. In each case, there is provided at the output of switch 35 (which is used in both the fish meter (FIG. 4) and ground meter (FIG. 7) an alternative R2, C2 combination, referenced R2" and C". Instead of feeding a meter, this additional circuit feeds a load resistor R3 across which is connected an audible alarm circuit (shown only for fish meter 19 in FIG. 6). A significant point is that resistor R2" can be adjusted to give a different time constant from those set by resistors R2. Thus the meters may give readings averaged over, say, 8 or more cycles but this may give too slow a response for an alarm. This is resolved by adjusting R2" to give an alarm in response to the average value of, say, two cycles.

R" may be buffered as necessary from R2. The following components are placed in parallel with the load resistor R3 in order to generate an alarm corresponding to a selected level: two op-amps 49 and 50; five resistors (including two potentiometers 51 and 52): and one monostable circuit 53. Potentiometer 52, with vernier knob, sets the voltage threshold on the negative terminal of comparator op-amp 50. If the amplified voltage from R3 exceeds the voltage on the negative input by a small amount an audible alarm is generated. The alarm will continue to ring until the amplified voltage is slightly less than the theshold voltage on the negative input to op-amp 50. This hysteresis is inherent in the circuit as shown. Op-amp 49 provides a non-inverting D.C. amplifier with a gain of approximately 42 which is selected by potentiometer 51 so that the voltage at the output of op-amp 49 equals 10 v when the meter is reading full scale i.e. 1 ma. Hysteresis is required in the comparator as the voltage across the meter varies slightly before settling.

Figure 7:
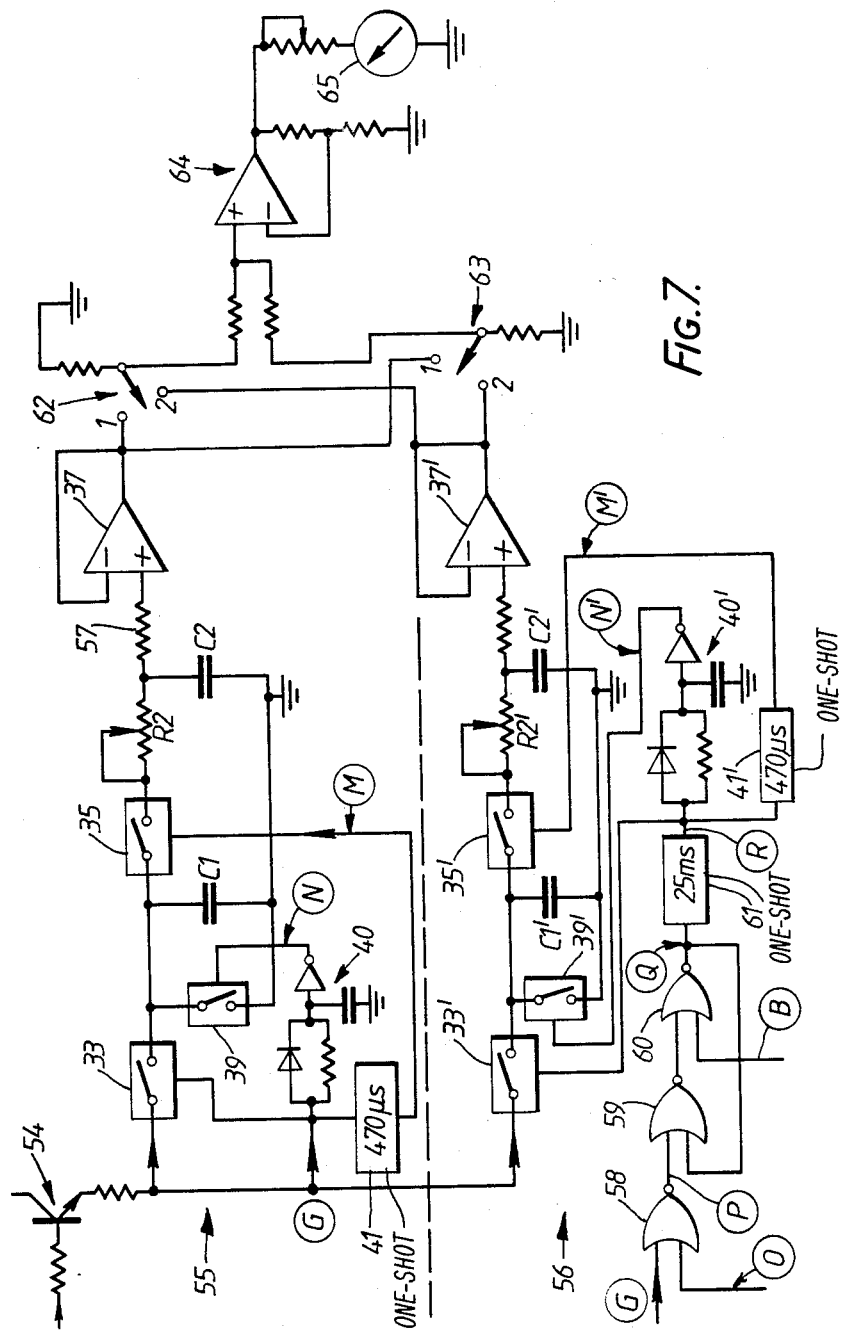
FIG. 7 is a diagram of a ground metering circuit.

FIG. 7 shows one form of the ground metering circuit 20. It will be appreciated that it uses the same sample-and-hold technique as the circuit of FIG. 4. Thus, in the upper part of FIG. 7 corresponding components have been given the same references, e.g. 33, and in the lower part corresponding components are identified with the same references qualified by a dash, e.g. 33'.

The analogue signal from amplifier 6 is fed to the base of transistor 54 from where the signal is taken to first and second bottom echo component processing circuits 55 and 56.

The first bottom echo component processing circuit 55 comprises semiconductor switches 33, 35 and 39 (type 4016), integrating capacitor C1, a leaky integrator and storage means (composed of variable resistor R2 and capacitor C2), a resistor 57 and an amplifier 37. Switch 33 is controlled by signal G (FIGS. 1 and 3) which is a signal of 20 to 40 milliseconds commencing when the first bottom echo component has reached a given amplitude. When signal G is not present, switch 33 is open and switch 39 closed, so that the charge on capacitor C1 tends towards zero. On the rising edge of signal G, switch 33 closes and switch 39 opens, thereby allowing capacitor C1 to charge in proportion to the quantity of the first echo component signal strength (an approximation to the integral of the signal).

On the negative-going edge of signal G, switch 33 opens to halt the integration process and a one-shot multivibrator 41 is activated to produce a short signal M (FIG. 8) which closes switch 35, allowing the integrated first echo signal to charge capacitor C2 via resistor R2.

A delay circuit 40 composed of a diode, resistor, capacitor and inverter produces a signal N from signal G to open switch 39 and then to close it only after switch 35 has opened.

The elements R2 and C2 provide an adjustable sample-and-hold circuit. If resistor R2 is set to zero ohms, capacitor C2 holds the charge from the one previous echo, so that the voltage across the capacitor C2 might then vary suddenly, e.g. drop almost to zero should the echo component not be received during one cycle of the system. By increasing the value of resistor R2, the capacitor stores the average of more and more cycles (upto 85 with the resistor R2 at 100 kohms). Typically one might set the resistor at an intermediate value to store the average of the last, say, ten to fifteen cycles.

The second bottom echo circuit 56 is similar in that it comprises components corresponding to components of circuit 55. The difference relates to additional elements which are a NOR gate 58, a latch comprising NOR gates 59 and 60 and a one-shot multivibrator 61 of 25 ms duration.

Figure 8:
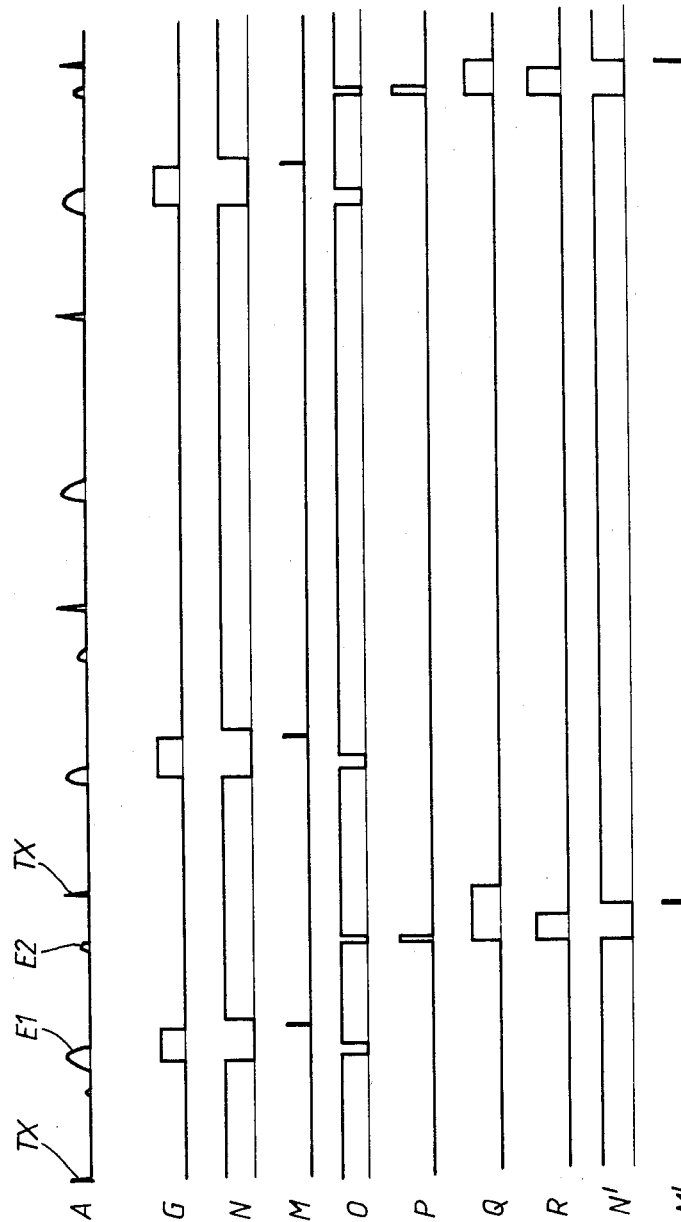
FIG. 8 shows a series of waveforms illustrating the operation of the circuit of FIG. 7.
Figure 9:
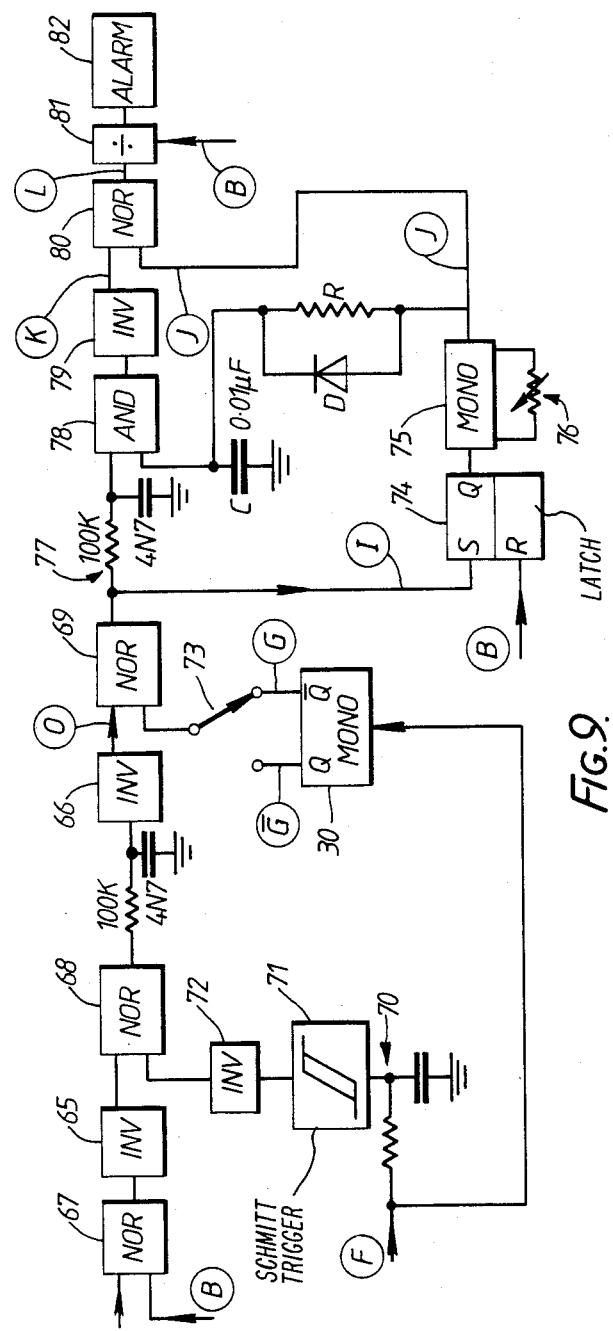
FIG. 9 is a circuit diagram of a ground alarm.

NOR gate 58 is fed by signal G and also by the output of an inverter of FIG. 9. That output is designated signal O in FIG. 8 and is a pulse train identifying echoes (particularly bottom echoes) of sufficient amplitude. NOR gate 58 causes that portion of signal O occurring during the first echo to be eliminated, leaving its subsequent portion, occurring at the second echo and shown as signal P in FIG. 10. Signal P will thus occur at each second bottom echo of sufficient amplitude to trigger the circuit 35 of FIG. 9.

Signal P sets the latch 59, 60 which is reset by signal B (the transmission pulse—FIG. 2). The output signal Q of the latch fires the multivibrator 61 to produce signal R which thus starts when the second bottom echo reaches a given amplitude and stops 25 milliseconds later. Signal R is used in place of signal G in the second circuit 56 and so extracts the second bottom echo.

The two circuits 55 and 56 are coupled by switches 62 and 63 to an amplifier 64 and meter 65, the meter being as described above in relation to FIGS. 1, 4 and 6.

With switches 62 and 63 in their upper positions, meter 65 displays the first bottom echo processed signal. In their downward positions, the second bottom echo processed signal is displayed. With one switch up and the other down the sum of the signals is displayed.

It will be observed that, in FIG. 8, four cycles are shown in which, in the second, the second bottom echo is too small to be captured and in the third, both bottom echoes are missing. As shown by the other waveforms, the various switches are operated to prevent these low or absent signals from significantly reducing the meter reading in view of the sample-and-hold features.

FIG. 9 shows one form of the ground alarm circuit 17 and which measures the width of return echo signals.

This circuit has particular, but not exclusive, use with echo sounders, so the subsequent description will describe the circuit in that context, i.e. with first and second bottom echo components. In that case, the second bottom component is of especial interest as its characteristics, e.g. width at a particular level, have been found to be especially sensitive to seabed hardness, probably because of the double reflection involved.

The output of the amplifier 6 is shaped by the Schmitt trigger circuit 14b (FIG. 1), with a threshold set by resistor 9, so that only echo components having a magnitude above the threshold are passed to the circuit of FIG. 9. Inverters 65 and 66 and NOR gates 67, 68 and 69 further process the signal, gating it with the previously described signals B and F to eliminate or mask out in each cycle all components occurring before the first and second bottom echo components. In order to eliminate fish signals, signal F is delayed at 70. It is then shaped at 71 and inverted at 72. The resulting signal at 66 is signal O of FIG. 8.

NOR gate 69 then gates the output of inverter 66 with signal G from the monostable circuit 30, or its inverse depending upon the position of a switch 73. Signal G has the effect of gating out the first echo signal or everything except the first echo signal, depending upon the position of switch 73.

Figure 10:
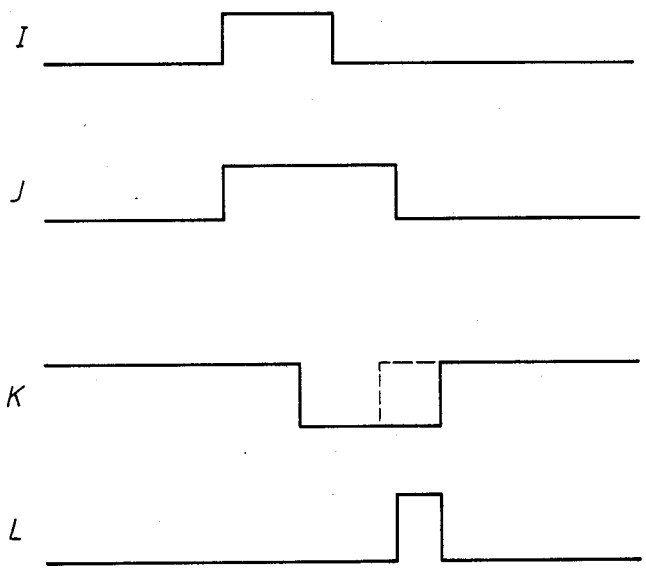
FIG. 10 shows wave forms in the ground alarm circuit.

The extracted echo component shown at I in FIG. 10, sets a latch 74, reset by signal B of FIG. 2 at the next transmission pulse. The output of the latch 74 triggers a monostable circuit 75 having a duration from 1 to 50 milliseconds manually selected by variable resistor 76. The output of circuit 75 is shown at line J of FIG. 6.

The output of NOR gate 69 also goes to an R-C combination 77 in order to delay the pulse I, which then proceeds to AND gate 78, inverter 79 and NOR gate 80. Line K shows pulse I in full lines, as delayed and appearing at the input of NOR gate 80. Its trailing edge occurs after the trailing edge of pulse J, causing the output L of NOR gate 80 to go high. This condition signifies that the echo concerned had a magnitude above the threshold set by items 9, 6 and 14b of FIG. 1 and, at that threshold level, had a width exceeding a value set by resistor 76. If the pulse were as narrow as is indicated by the dotted lines at K, then the output of NOR gate 80 would remain low.

Signal L is passed to a divide-by-two circuit 81 giving an alarm signal when circuit 81 detects two pulses L in successive cycles defined by signal B. The alarm signal is passed to an audible alarm circuit 82 and may also be sent to a visual display, e.g. by a sample-and-hold circuit to retain the alarm for a given time. By integrating the signal L, the visual display can give a value defining the length of pulse L.

FIG. 9 shows a further masking feature applicable whenever the second or third or later bottom echo is to be processed in this or in any other way, e.g. for leading edge analysis. This masking feature is the feeding of pulse J via network R, D and C, delaying the trailing edge of pulse J, to AND gate 78. This feature masks out all bottom echo components subsequent to the one being analysed.

The analysis of the second bottom echo on the basis of width proves useful in detecting the nature of ground conditions under water, as the echo increases in length as the hardness increases. For example a fisherman may be looking for conditions normally found at the border of rocky and sandy ground. With the circuit of FIG. 9, it is found that, when traversing from a sandy bottom into rocky ground, distinctive patterns of alarms are produced indicating the presence of the required mix of rocky and sandy conditions. During and after this process, one observes an increasing reading on the ground meter.

On the other hand, it may be found that spikes in and at the end of the trailing edge of the second bottom echo cause an alarm because the time constants involved will cause the echo to appear longer than it is. In that case, a ground alarm as described in the above mentioned UK patent application may be preferred. Alternatively an alarm as shown in FIG. 6 may be attached to the ground meter of FIG. 7 to give a ground alarm based upon a selected meter reading. Again suitable fishing ground can be identified by means of a distinctive series of alarms.

Figure 11:
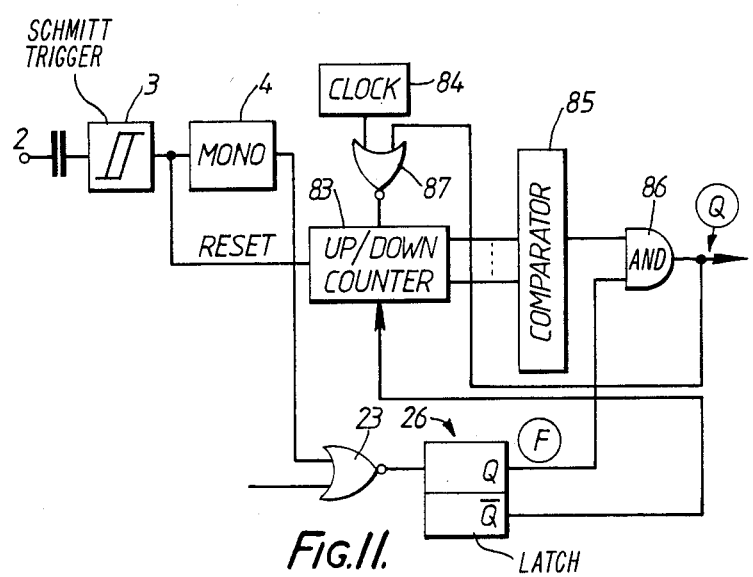
FIG. 11 shows a circuit of a second bottom echo timing circuit.

FIG. 11 shows a modification, which is a digital method of identifying second or third bottom echoes, to produce a signal corresponding to signal P in FIG. 8, thus replacing the circuitry in FIG. 9 producing signal O together with gates 58 to 60 of FIG. 7. This modification uses the transmission pulse received at input 2 in FIG. 1 and the first bottom echo pulse signal F produced by monostable circuit 26 also shown in FIG. 1. It comprises an up/down counter 83, a clock 84, a comparator 85, an AND gate 86 and NOR gate 87.

The counter is designed to count up when signal F goes low (when TX occurs) and count down when F goes high (when the bottom is acquired). Also, the counter is reset by monostable circuit 3, i.e. every time there is a transmission, in case the first echo is lost. The parallel output of the counter is compared with 'zero' at the comparator which issues a '1' on detecting 'zero'.

At transmission the counter is reset, so the comparator issues a '1' but this is blocked by signal F at gate 86, keeping Q low at that stage.

The counter increments until F goes high, when the counter decrements to reach zero, causing the inputs to the AND gate 86 both to be high, resulting in Q going high, thereby commencing gating for the second echo. If F does not go high (first echo lost), the counter will continue to increment until the next transmission. When Q does go high, the counting is stopped by gate 87.

As the second echo is slightly more than double the depth of the first echo (this due to the depth of the transducer on the hull), gating for the second echo will commence slightly before it arrives, even if the maximum error of one clock pulse occurs when measuring the interval from transmit to the bottom pulse. The maximum error in depth is designed to be not more than half a meter. Hence a vessel with a draft of more than half a meter will begin processing the second echo slightly before it arrives.

The LSB of the counter should represent not more than half a meter of water; this determines the lowest clock frequency, which should preferably be greater than or equal to 1.5 khz. The maximum operating depth can be calculated from the clock frequency and the number of bits in the counter. The maximum operating depth for the counter should preferably be equal to or greater than that corresponding to the period of the longest pulse repetition period, e.g. for a longest period of 3 seconds, there will be a maximum depth of 2250 m. In this example 12 bits would be required for the counter. In order to extract the third bottom echo component, the circuit of FIG. 11 can be modified to operate its described count sequence again to define the expected time of arrival of the third bottom echo. The maximum count reached will be stored and either the counter will be reset to recount down from that value or will be configured to count up to that value.

Figure 12:
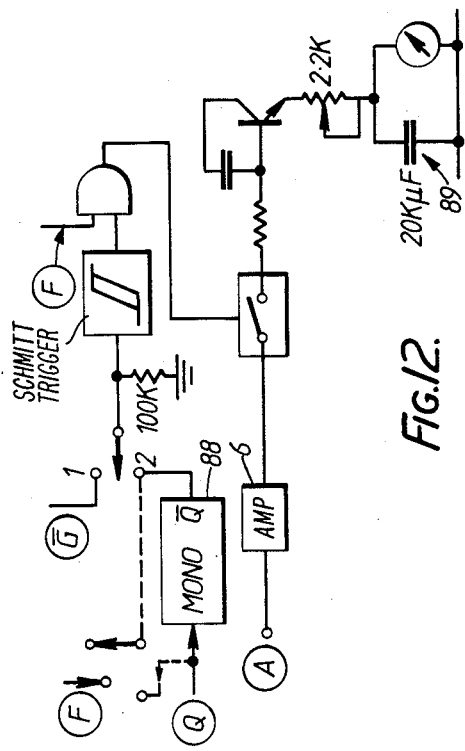
FIG. 12 shows a circuit of a modification of a ground metering circuit.

Signal Q may be used in two ways. Firstly it may replace the circuitry already described for producing Q. Secondly, it may provide the basis of an alternative ground metering circuit as shown in FIG. 12. A monostable 88 converts signal Q into a gating signal of sufficient length to include the second echo but exclude later echoes and ambient noise which would be included if signal Q itself were used. A capacitor 89 across the meter can only charge up whilst monostable 88 is active. The meter will thus display the integrated value of echoes received. Thus the capacitor 89 will provide with the resistance in the circuit a relatively large time constant compared with the length of the time slot over which integration is to occur. A device, suitable for example for shallow water use by lobster fishermen, can be based upon the circuit of FIG. 12. In this case, it is sufficient to integrate all ground echoes, including the third and fourth and so on, said echoes being perceivable in shallow water conditions. In that case signal F may be supplied to bypass circuit 88 (as indicated by dotted lines). Signal Q itself may nevertheless be suitable in such an application as it will pass the second, third, and so, echoes, all of which are especially indicative of ground conditions owing to their receipt after multiple reflections. An alternative gating signal for the third and later echoes only could also be considered as a possibility. A simple circuit designed specifically for such an application may include the circuit of FIG. 12 with the circuitry for producing the necessary timing signals, together with a depth measuring circuit, the two feeding a digital display replacing the analog meter of FIG. 12.

Figure 13:
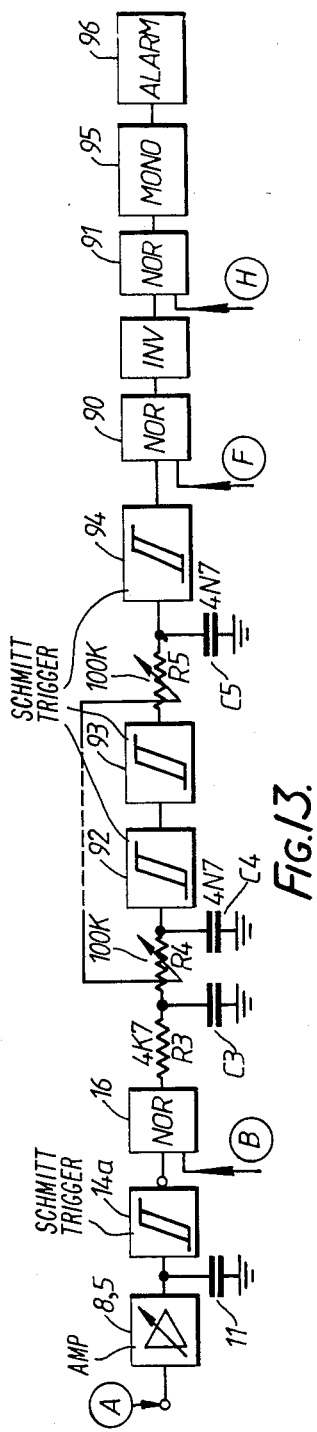
FIG. 13 is a circuit diagram of a fish detecting circuit.

Attention is now directed to the fish alarm 15 of FIG. 1, shown in more detail in FIG. 13. This circuit also utilises time slot analysis. Analog signal 14A passes through the variable amplifier 8, 5 and Schmitt trigger circuit 14A of FIG. 1 in order to digitise it, i.e. to convert each echo component of signal A to a pulse when that echo component exceeds a threshold set by resistor 8. The transmission component is eliminated by signal B fed to the NOR gate 16 in FIG. 1. NOR gates 90 and 91 define a time slot by means of signals F and H, such time slot commencing at a time defined by the marker signal H (from monostable circuit 30 of FIG. 1) and ending at a time defined by the bottom pulse signal F. This time slot is therefore synchronised by the first bottom echo pulse and its width is defined by variable resistor 31 (FIG. 1).

As the threshold of this circuit is relatively low, the first bottom pulse emerging from NOR gate 16 would tend always to be in that time slot and so seriously affect the detection of fish.

Accordingly the circuit of FIG. 13 includes delay means provided by resistors R3 to R5, capacitors C3 to C5 and Schmitt trigger circuits 92 to 94. Resistors R4 and R5 are ganged together to vary the delay. With R4, R5 set for minimum delay, the first bottom pulse will produuce an output at NOR gate 91. The delay can then be reduced by the operator until the output is zero, whereupon it is known that the time slot ends at or just above the seabed. Thus, resistors R4, R5, by delaying the echoes, effectively move the time slot upwards in space until its trailing edge is at the leading edge of the bottom echo. The delay means also acts as a filter of the digitised echo signal to reduce the effect of noise spikes in the signal.

This circuit complements the fish metering circuit 19 and the ground metering circuit 20. Fish metering circuit 19 can also be controlled by a time gate terminating at the leading edge of the bottom pulse and the meter reading (representing the integral of the echoes within the gate) will thus be increased, inter alia, by fish close to the bottom. The alarm circuit of FIG. 13 is particularly useful as skippers will not be abel to keep continuous watch on the meters, but can respond when an audible alarm occurs. Sea trials show that a consecutive series of five or six alarms or even more is indicative of a large concentration of fish very close to the bottom and which are not obvious on the most sophisticated scale-expanded or colour echo sounders.

Figure 14:
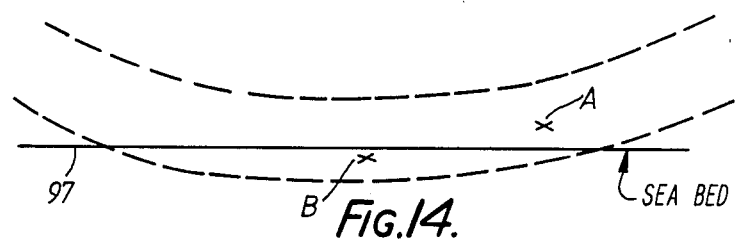
FIGS. 14 to 17 show diagrams illustrating the operation of the circuit of FIG. 13.

The various theoretical and practical considerations of fish detection close to the sea bed will now be discussed. One feature to consider is shown in FIG. 14 which represents the sea bed 97 and the part spherical wave front of the leading and trailing edges of the transmitted ultrasonic pulse. Owing to the beam spread, signals return over a relatively wide area, so that a fish A close to the sea bed but not directly under the transducer produces an echo which is received at such a time as to appear to be at B. If the fish is sufficiently above the sea bed, its echo EF appears as in FIG. 15 separated from the bottom echo E1. However, with the situation shown in FIG. 14, fish A appears on the leading edge and so EF is of higher amplitude. These signals are as shown on an oscilloscope and depict the undetected waveform as seen at the output (collector) of an input transistor of amplifier 8. The total length of echo E1 is typically 8 to 10 ms. and it exhibits a characteristic bump at its peak.

Despite the fact that such fish echoes exist, the detection of fish close to the bottom is one of the perennial practical problems facing the fisherman. Conventional echo sounders show a display of depth against distance sailed and the presence of fish in mid-water is revealed as echoes. There are problems however if the fish are near the bottom. If the equipment is sufficiently sensitive, such fish gives rise to echoes but it is the identification of these echoes that is problematic.

Figure 15:
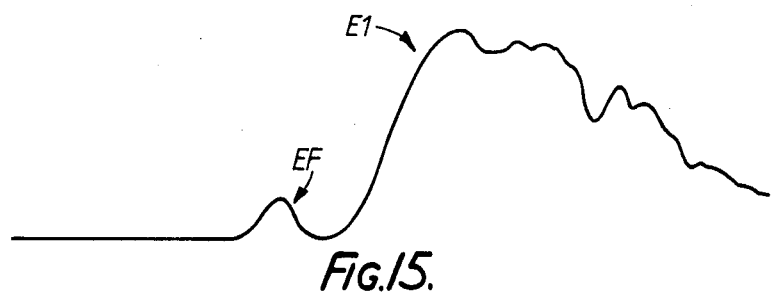
Figure 16:
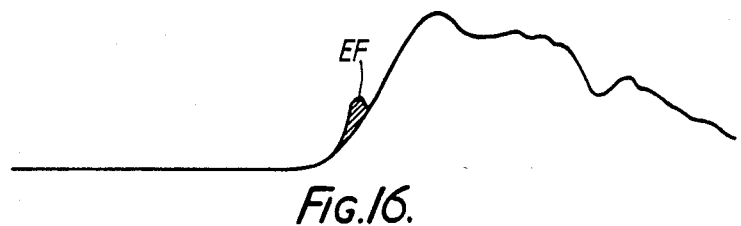

R. B. Mitson (Fisheries Sonar, 1983, Section 5.1.2) states that it is quite impossible to separate fish echoes from sea bed echoes if they are less than a half a pulse length above the bottom at normal incidence. However, as FIGS. 15 and 16 show, a fish close to the seabed does influence the return echo and must in principle be detectable. What may be uncertain is whether this echo EF is a fish or simply a small bump in the ground contour. In the case of FIG. 15, clear water would normally be seen between EF and E1 to resolve the ambiguity. Moreover Mitson's analysis assumes a fish echo which is a replica in shape and duration of the "square wave" transmitter pulse, but in practice we believe it has a Gaussian shape and may have a shorter length. This would have the effect of reducing the effect of the half length criterion without necessarily introducing the fish/ground ambiguity.

One method of measuring these fish echoes is with the fish metering circuit 19 to integrate the signal within a time gate locked to the bottom and displaying the result on a meter with a medium response time. Such fish metering circuit may in fact be similar to FIG. 12 but with appropriate gating signals fed to it. The gate is triggered off one bottom pulse (e.g. by signal H) to open it, and is closed by the next bottom pulse, the gate thresholds being set above the level of fish echoes. The meter reading will rise in the presence of fish close to the bottom. However, this does not itself distinguish from ground hardness variations which affect the bottom pulse leading edge. Using the ground metering circuit 20 as well to monitor hardness enables one to make this distinction in most situations. The audible alarm system of FIG. 13 has proved to be even more sensitive to fish detection and so complements the metering. Any signal exceeding the fish threshold and occurring within the gate will set off the audible alarm. The gate is opened at an appropriate and variable distance from the bottom by triggering off the preceding bottom pulse and the gate is opened when the bottom echo reaches an appropriate threshold. To avoid false alarms the gate is moved by R3, R5 to close a few microseconds to a few milliseconds before the bottom echo reaches its threshold (determined by signal F), so that, in effect, the gate is turned off fractionally before the bottom echo reaches the fish threshold. Note that the leading edge used to produce the gate has been smoothed by capacitor 13. The signal processed by the circuit of FIG. 13 may also be smoothed slightly to reduce noise, as shown by capacitor 11, but this action may be made very small in comparison to the action of capacitor 13. Capacitor 11 may even be removed.

It can now be seen that a fish close to the bottom increases the amplitude of the leading edge (FIG. 16) and so breaks through the threshold. In other words, even a fish echo which may be too small by itself to trigger the alarm will trigger the alarm if added to the leading edge of the bottom echo (assuming that the phase relationship is such than an additive effect occurs). The further up the leading edge the fish echo occurs, the more sensitive the alarm. In a laboratory simulation, 'fish' only 75 mm from the seabed produced an alarm. Good oeration in practice may depend on weather conditions, but even with false alarms, it may be feasible for the human ear to distinguish the pattern of such alarms from those of fish.

Figure 17:
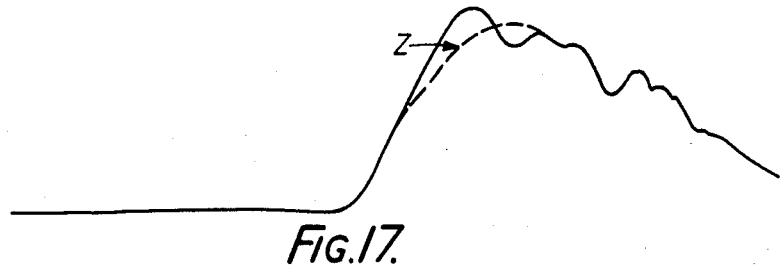

Another theory for the success of this method of fish detection is shown in FIG. 17. Whilst observing recordings of actual soundings taken at sea with fish echoes close to the bottom it can be seen clearly that alarms are generated when the fish are close to the bottom but not actually on it. However, some alarms are generated without the obvious presence of any echoes at all. At the instant of these alarms it was observed that the characteristic "bump" of the bottom echo becomes rounded off as at Z. This causes the bottom pulse generated at the output of Schmitt 14c to jump back i.e. is delayed by perhaps 100–200 microseconds. Again the effect is to release a "fish" pulse through the system at NOR gate 90 of FIG. 13. (Of course it is effectly a bottom signal in the fish circuitry which causes this).

The theory behind this phenomenon is that a shoal of fish of sufficient density/volume lying on the seabed, deeply within the "dead zone" and because of the overlapping of the echoes with the main bottom echo causes a distortion of the leading edge of the main seabed echo pulse. It may be a Fresnel-type effect, with the fish echo EF not being in phase with the bottom echo. This distortion would be extremely difficult to see even on an oscilloscope but is relatively easily detectable using the techniques of the present system.

The embodiments disclosed above use logic components hard-wired to achieve the desired functions with switches where necessary to change the mode of operation. Alternative circuitry could be used to achieve the same and similar effects. Microprocessor circuitry plus software may also be used to implement at least some of the described functions. For example, waveforms may be digitised, stored in memory and analysed by software, e.g. to locate and identify the various echoes, especially the bottom echo components and their leading edges. References herein to time slots may in some cases, especially with regard to the leading edges of bottom echo components, be considered to include memory address ranges. Such ranges correspond to time slots and may be identified by analysing the values of, and changes in values of, memory locations rather than by real time processing relative to bottom pulses and transmitted pulses.

I claim:

1. A signal processing apparatus for indicating reflective properties of a region, the apparatus comprising:
    means for transmitting a pulsed signal into said region;
    means responsive to a return echo signal produced in response to said transmitted signal and represented as a waveshape, for defining a time slot synchronised with a pulse of said return echo signal and terminating at an upper part of a leading edge of said pulse;
    means for utilising said time slot to extract only a major leading edge portion of said pulse; and
    means for processing said leading edge portion for providing a signal representative of the shape of said leading edge portion which is indicative of said reflective properties of said region.

2. Apparatus according to claim 1, wherein said providing means comprises integrating means for determining the area under said leading edge portion of said waveshape.

3. Apparatus according to claim 2, wherein said responsive means comprises level detecting means responsive to said return echo signal passing through a preset level to define one end of said time slot.

4. Apparatus according to claim 3 for use with a repetitive transmitted pulse and thus a repetitive return echo signal, wherein an end of said time slot opposite said one end is defined by means defining a predetermined time and responsive to said pulse of said echo signal so that said other end of said time slot for one echo pulse occurs said predetermined time after the occurrence of the corresponding echo pulse in a cycle of said repetitive return echo signal immediately preceding the cycle containing said one ehco pulse.

5. Apparatus according to claim 4, and comprising sample-and-hold means for holding said representative signal and including switching means responsive to said pulse having an amplitude below a given level to prevent updating of the output of the sample-and-hold means.

6. Apparatus according to claim 2 for use with equipment wherein pulses are transmitted repetitively so that cycles of return echo signals are received, said responsive means having a threshold level below which the responsive means will not respond to a return echo signal, and the apparatus further comprising means for holding said representative signal produced in one cycle for display in a subsequent cycle when, in that subsequent cycle, said threshold level is not reached and the associated time slot thus becomes undefinable.

7. Apparatus according to claim 6, wherein said holding means comprises capacitance means and there is a controllable switch for coupling said integrating and said holding means.

8. Apparatus according to claim 2, for use in sea bed hardness classifying by echo sounding in which each said return echo signal includes a first and a second bottom echo component, wherein said responsive means are such as to define said time slot to extract the leading edge of said second bottom echo component.

9. Sonar equipment in combination with signal processing apparatus according to claim 2.

10. Radar equipment in combination with signal processing apparatus according to claim 2.

11. Medical ultrasonic diagnostic equipment in combination with apparatus according to claim 2.

12. An apparatus as claimed in claim 1 for use in detecting reflective properties of a surface over which a body of water lies using a return echo signal produced by hydro-acoustic transmitter-receiver equipment, said signal including at least first and second bottom echo components obtained from reflections from said surface and wherein said responsive means is operable to extract from said return echo signal at least one bottom echo component;
    and said apparatus further comprises:
    means for processing the extracted component to produce a further signal when the width of the extracted component exceeds a given value, said further signal being indicative of said reflective properties of said surface.

13. An apparatus according to claim 12, wherein said defining means is responsive to said return echo signal in such a manner as to exclude said first bottom echo component.

14. An apparatus according to claim 13, wherein said defining means is such as to mask from return echo signals all bottom echo components before and subsequent to a selected bottom echo component.

15. An apparatus according to claim 12, and comprising threshold means to define a signal level at which to define said width.

16. An apparatus according to claim 12, wherein said processing means comprises means for defining a masking signal initiated by the extracted component and means for comparing the masking signal with a delayed version of the extracted component to provide said further signal when the trailing edge of said delayed version occurs after the trailing edge of said masking signal.

17. An apparatus according to claim 16, and comprising means for adjusting the length of said masking signal to vary the width at which said signal occurs.

18. A method of processing echo signals to indicate reflective properties of a region, comprising the steps of transmitting a pulse of energy into said region, receiving a return echo signal from said region produced in response to said transmitted signal and represented as a waveshape, and analysing said return signal; the step of analyzing said return signal comprising identifying a pulse within said return signal, indentifying the leading edge of said identified pulse, and determining the area under a major portion of said leading edge portion of said waveshape by integration, said area being indicative of said reflective properties of said region.

19. A method according to claim 18, wherein each of said echo signals is derived by transmitting a pulse in a direction having a vertically downward component through water towards a bottom of said water, and said identified pulse is a bottom echo pulse from said bottom.

20. A method according to claim 19, wherein a series of pulses is transmitted toward said bottom, and said identifying step identifies said bottom echo pulse whenever it occurs in each cycle of return echoes, and said step of determining the area includes averaging the areas under the leading edges of a plurality of successive bottom echo pulses.

21. Signal processing apparatus for processing return echo signals produced as a result of transmitting a pulse of energy towards a surface area of a body, and wherein depending on reflectivity of said surface area, a portion of said pulse of energy will be reflected and another portion will enter a body zone underlying said surface area and will produce additional reflection of pulse energy, thereby to produce a composite return echo pulse from said body zone, the apparatus comprising;
means responsive to a return echo signal generated by said reflected portions of said pulse of energy and represented as a waveshape, for defining a time slot so synchronised with said return echo pulse as to encompass a range containing, of said pulse, substantially no more than a major portion of a leading edge of said pulse; and
means for processing the encompassed leading edge portion for providing a signal representative of the area under said leading edge portion of said waveshape by integration and thus representative of reflectivity of said zone.

22. Signal processing apparatus for indicating the existence of fish in the region of the bottom of a body of water by processing return echo signals produced as a result of transmitting a pulse of energy towards a surface area of said bottom, and wherein depending on reflectivity of said surface area and the presence of fish close thereto, a portion of said pulse energy will be reflected and another portion will enter a body zone underlying said surface area and will produce additional reflection of pulse energy, thereby to produce a composite return echo pulse from said body zone, the apparatus comprising:
means responsive to a return signal generated by said reflected portions of said pulse of energy and represented as a waveshape, for defining a time slot so synchronised with said return echo pulse as to encompass a range terminating at an upper portion of said leading edge portion of said pulse;
means for adjusting said time slot relative to said return echo pulse so that no more than a section of said leading edge portion of a level below a predetermined level falls within said time slot; and
means for detecting a signal level of said predetermined level within said time slot, said detected signal being indicative of fish close to said bottom which cause alteration of the shape of said leading edge portion so as to introduce a larger section of said leading edge portion within said time slot.

23. A signal processing apparatus for determining properties of a surface of a body based on the characteristics of a reflected echo signal produced in response to a signal transmitted toward said surface, comprising:
transmitting means for transmitting a pulsed signal toward said signal;
receiving means for receiving a pulsed echo signal in response to said transmitted signal, in the form of a waveshape which varies with time and represents the reflection of said transmitted signal off said surface;
designating means for designating a period of time associated with the occurrence of said echo signal, said time period synchronized so as to commence not later than a beginning portion of a leading edge of a pulse of said echo signal and to terminate at an end portion of said leading edge of a pulse of said echo signal;
selecting means for selecting a major segment of said leading edge of said echo signal waveshape which occurs during said designated time period; and
signal generating means for generating a signal representative of the area under said echo signal waveshape which is bounded by said selected leading edge segment, said area being indicative of said properties of a surface of said body.

24. A circuit, for use with hydro-acoustic transmitter-receiver equipment, to provide an indication of the existence of fish, the circuit comprising:
means having an adjustable threshold and responsive to a return echo signal of said equipment to define a moment at which the leading edge of a first bottom echo component of said return echo signal exceeds said threshold, said adjustable threshold being adjustable to set said moment at an upper portion of said leading edge;
means coupled to said responsive means to define a time slot terminating at said moment and to include a major portion of said leading edge;
means for utilising said time slot to extract a portion of said return echo signal and to emit a signal when said portion exists in said time slot;
means for coupling said return echo signal to said utilising means and having a sensitivity at such a level that a major portion of said leading edge will reach said utilising means for extraction by said time slot;
means in said coupling means for providing an adjustable delay for the return echo signal, to delay the return echo signal in time relative to said time slot, so that said time slot can be varied relative to said delay substantially to exclude the first bottom echo component from said extracted portion, whereby an outut signal will be emitted when said leading edge is distorted, in particular by fish.

25. A circuit according to claim 24, wherein said time slot defining means include means coupled to said responsive means to define the time slot commencement to occur in response to the occurrence of a preceding first bottom echo.

26. A method of indicating fish in a zone adjacent a bottom of a body of water and comprising;
repetitively transmitting signals towards said bottom;
detecting an upper portion of a leading edge of a return bottom echo signal produced in response to said transmitted signals;
defining a time slot terminating at the detection of said upper portion and including a major portion of said leading edge;
using that time slot to extract a portion of the return echoes in each cycle at such a level of sensitivity that a major portion of said leading edge will be extracted;
introducing a delay in the return echoes relative to said time slot and adjusting that delay until the extracted portion is substantially zero whereby said time slot terminates substantially at said bottom; and
providing an output when an extracted portion exists, whereby said output will occur when said leading edge is distorted, in particular by fish.

* * * * *